(12) United States Patent
Batdorf

(10) Patent No.: US 7,998,530 B2
(45) Date of Patent: Aug. 16, 2011

(54) BARRIER COATING HAVING EFFECTIVE MOISTURE VAPOR PERMEABILITY

(75) Inventor: Vernon H. Batdorf, Minneapolis, MN (US)

(73) Assignee: Protective Chemistries, Inc., Minneapolis, MN (US)

( * ) Notice: Subject to any disclaimer, the term of this patent is extended or adjusted under 35 U.S.C. 154(b) by 838 days.

(21) Appl. No.: 11/895,094

(22) Filed: Aug. 23, 2007

(65) Prior Publication Data

US 2009/0075072 A1 Mar. 19, 2009

(51) Int. Cl.
*B05D 3/02* (2006.01)
(52) U.S. Cl. ............ 427/384; 427/385.5; 427/387; 427/389.9; 427/392; 427/394; 427/396
(58) Field of Classification Search ............ None
See application file for complete search history.

(56) References Cited

U.S. PATENT DOCUMENTS

| 4,716,188 | A | | 12/1987 | Mariusson |
| 5,004,643 | A | * | 4/1991 | Caldwell ............ 442/82 |
| 5,032,450 | A | | 7/1991 | Rechlicz |
| 5,856,245 | A | * | 1/1999 | Caldwell et al. ........ 442/76 |
| 6,901,712 | B2 | | 6/2005 | Lionel |
| 2006/0155031 | A1 | | 7/2006 | Wiercinski |
| 2007/0042196 | A1 | | 2/2007 | Smith |

OTHER PUBLICATIONS

Kirk-Othmer Encyclopedia of Chemical Technology, vol. 21, pp. 977-1032, 1997.*

* cited by examiner

*Primary Examiner* — Erma Cameron

(57) ABSTRACT

The invention discloses improved water-based compositions that are useful as barrier coatings to regulate the intrusion and extrusion of air and water. Specifically, the water-based compositions, when dried, provide barrier-coatings that have an effective combination of properties including moisture vapor permeability, air permeability resistance, and water resistance. More specifically, the water-based barrier compositions are designed to be environmentally friendly, and user friendly, and provide coated-substrates that are particularly useful for the manufacture of enclosed structures including buildings.

12 Claims, No Drawings

BARRIER COATING HAVING EFFECTIVE MOISTURE VAPOR PERMEABILITY

BACKGROUND

There continues to be a need for improved barrier coatings in that considerable energy loss occurs through air leakage in the wall assembly of heated or air conditioned buildings. In order to minimize excess air and water intrusion, building codes often require the use of a barrier on interior walls such as 4-mil poly and/or a building rape sheeting such as Tyvek™ from Dupont (Willington, Del.) on exterior walls. Ideally, to reduce the incidence and prevalence of conditioned internal-air from exiting into the wall cavity and having moisture condense on the inside surface of the exterior wall; the building rape should have effective moisture vapor permeability. It is generally understood that decreased moisture vapor permeability is often undesirable in that high humidity conditions within the wall assembly increases the potential of mold development. A drawback with building rapes like Tyvek™ is that while these sheeting materials are very hydrophobic, providing a water-resistant barrier, they are ineffective as air barriers. Tyvek™ was measured at 0.013 cfm/sf at 0.3 inch water pressure, with the acceptable limit for air barriers being less than 0.004 cfm/sf at 0.3 inch water pressure. In order for sheeting type barriers to be effective, they must be continuous without penetrations or openings. In practice, there are often improperly sealed edge joints, taped joints that fail due to cold weather application, and wind blown open joints allowing for water and air penetration. Any leakage point from an improperly sealed sheeting edge joint will allow air and water to flow behind the sheeting all across the building face with multiple opportunities for penetration through the wall assembly. The application cost is high due to the need for cutting, nailing or stapling, and taping.

A preferred barrier film/coating should have an effective combination of properties including low air permeability, high moisture vapor permeability, and good water resistance. For example, a barrier film/coating having moisture vapor permeability greater than 1 U.S. Perm is considered a breathable film. Furthermore, Canadian Standard CAN 2-51.32-M77 requires that a breathable barrier have moisture vapor permeability greater than 3 U.S. Perms. In continuation, the acceptance criteria for a breathable barrier film/coating as specified by the I.C.C. Evaluation Services, Inc. is a moisture vapor transmission rate greater or equal to 35 grams/m 2.24-hours (equivalent to 1.44 U.S. Perms tested at 100° F. and 75 percent relative-humidity differential).

It is known that liquid compositions are useful for the preparation of barrier coatings. Such compositions are easily applied onto wall surfaces, at the construction site, and often have processing and property advantages compared to building rapes. For example, several references are described below:

U.S. Pat. No. 4,716,188 (Mariusson, et al.) discloses a water-repellent and vapor-permeable solvent-based paint. A drawback with the barrier-composition is that volatile organic solvents are required. Such solvents are often less environmentally friendly compared to water-based barrier compositions.

U.S. Patent Application 20060155031 (Wiercinski; Robert A.) discloses a liquid applied air barrier which uses at least one water-soluble polymer for providing a vapor permeable membrane. A drawback of this invention is that the water-soluble polymer would be water leachable under wet conditions, and causes significant water absorption of up to 50%. The dried membrane also is applied at 20-100 mils thickness, which would be very difficult in a plant application to building panels, and very costly compared to the sheeting materials available.

Sto Corporation (Atlanta, Ga.) markets a water-based barrier composition (e.g., Sto Gold Coat) that can be spray applied and then dried to provide a barrier coating having a reported moisture vapor transmission rate of 5.6 U.S. Perms (wet cup, method B). The drawback with the water-based composition is that crystalline silica is used in the formulation, as reported in the material safety data sheet, which is a suspected carcinogen when inhaled. The moisture vapor permeability also drops significantly by the dry cup method at 37.8 centigrade. It was tested at 0.33 metric perms (0.50 U.S perms) at 200 microns wet.

Therefore, there remains a need for water-based compositions, having effective moisture vapor permeability when used as an air and water barrier coating, which are substantially free of volatile organic solvents and suspected carcinogens.

SUMMARY OF THE INVENTION

The present invention discloses improved barrier coatings, having effective moisture vapor permeability, which are substantially free of volatile organic solvents and suspected carcinogens.

The barrier coatings of the present invention are formed from water-based compositions comprising:
a) at least one water-based firm forming polymer:
b) at least one non-crystalline silica or silicate mineral:
c) at least one mineral filler:
d) at least one fungicide:
e) at least one ultraviolet light absorbing component:
f) at least one dispersant; and
g) at least one surfactant.

Furthermore, the water-based compositions have a volatile organic content less than 3% by weight and are substantially free of crystalline silica.

The invention further discloses a method, useful for the manufacture of coated substrates having effective moisture permeability, comprising the steps of:
1) providing at least one aqueous composition comprising;
   a) at least one water-based film forming polymer:
   b) at least one non-crystalline silica or silicate mineral:
   c) at least one mineral filler:
   d) at least one fungicide:
   e) at least one ultraviolet light absorbing component:
   f) at least one dispersant; and
   g) at least one surfactant; then.
2) providing at least one substrate;
3) applying said composition onto said substrate to form a wet-coated substrate;
4) drying the wet-coated substrate to form a dry coated substrate.

The method is particularly useful for the preparation of enclosed structures having a barrier coating that effectively reduces excess air and water infusion into the building wall cavity, while allowing extrusion of moisture vapor to prevent condensation within the exterior wall assembly.

Surprisingly, the water-based barrier composition when dried has air permeability in a range of from about 0.0002 to 0.004 ft3/minute-ft2 at 5.2 psf (pounds/square foot) and moisture vapor permeability greater than about 2.0 metric perms (3.0 U.S. perms), at a wet film thickness in a range of about 100 microns to 300 microns (30-120 microns dry), tested at 37.8 C., dry cup method.

Furthermore, the inventive water-based compositions may be pre-applied onto a substrate prior to shipment to the construction site or it may be spray applied onto a substrate at the construction site.

DETAILED DESCRIPTION OF THE INVENTION

The present invention discloses improved water-based compositions wherein the dried compositions are particularly useful as barrier coatings having an effective combination of properties including low air permeability, high moisture vapor permeability, and high water resistance.

The water-based barrier composition comprising:
a) at least one water-based film forming polymer:
b) at least one non-crystalline silica or silicate mineral:
c) at least one mineral filler:
d) at least one fungicide:
e) at least one ultraviolet light absorbing component:
f) at least one dispersant; and
g) at least one surfactant.

The water-based compositions are substantially free of volatile organic chemicals. The water-based compositions have a calculated volatile organic content less than about 3% by weight. The term volatile organic chemical as described herein is defined as an organic compound having a boiling point less than 240 degrees centigrade at ambient pressure. Furthermore, the volatile organic content described herein is a percentage based on the total weight of the water-based composition.

The aqueous composition used in the present invention comprises at least one water-based film forming polymer. Useful polymers include aqueous polyacrylics, aqueous polystyrene-acrylics, aqueous polystyrene-butadiene rubbers, acrylic-urethane dispersions, and aqueous polychlorinated-ethylene-acetate copolymers. Preferred water-based film forming polymers are S728, ND 4606 and NX1942 from BASF (Charlotte, N.C.), Ucar 820, 145, 123, DL313, and DL238NA from Dow Chemical (Midland, Mich.), RayCryl-1020, 444S, and 1610 from Specialty Polymers, Inc. (Woodburn, Oreg.), and Airflex 728 from Air Products (Allentown, Pa.). The water-based film forming polymer is present in the aqueous composition in a range of from about 10 percent by weight to about 50 percent by weight, preferably from about 15 percent by weight to about 40 percent by weight based on the total weight of the composition. A film-forming polymer content greater than about 40 percent by weight, based the dried composition, may be less desirable in that it may not allow for sufficient silica containing mineral content for air permeability. Alternatively, a film-forming polymer content less than about 15 percent by weight, based on the dried composition, may be less desirable in that it would result in insufficient composition strength and abrasion resistance.

The aqueous composition used in the present invention comprises at least one non-crystalline silica or silicate minerals. The silica is used to provide moisture vapor permeability in the dried film. Examples include Sipernat 22LS silica from Degussa (Piscataway, N.J.), Zeofree 80 precipitated silica from J.M. Huber Corp. (Atlanta, Ga.), Diafil Celite 325 and 530, and Celite 292, 238 from Celite Corp. (Fernley, Nev.), Attagel 19, 36, and 40 attapulgite clay from BASF Catalysts-Engelhard (Iselin, N.J.), and Dialite 416 or 426 perlite from Dicaperl Minerals, Corp. (Bala Cynwyd, Pa.). Preferred non-crystalline silica is Zeofree 80, and the preferred silicate mineral is perlite. The non-crystalline silica or silicate mineral is present in the aqueous composition in a range of from about 8% to about 38%, preferably from about 15% to about 32%, based on total solids. Non-crystalline silica or silicate mineral content less than about 8% may be undesirable in that the moisture vapor permeability would be too low (less than 0.6 metric perms) to be considered a breathable film Alternatively, a non-crystalline silica or silicate mineral content greater than about 38% may be undesirable in that it would be too low in water resistance and fail the building code requirements for water penetration through the applied film.

The aqueous composition contains at least one UV (ultraviolet light) absorbing component. The UV absorbing component is used as a means to provide weather protection for the film forming polymer and antimicrobials used in the product by protecting them against degradation caused by UV radiation. Useful UV absorbing components include pigments CR-828 titanium dioxide from Kerr-McGee Pigments (Oklahoma City, Okla.), YO-313 and Y25LOM yellow iron oxide from Revelli Chemical (Greenwich, Conn.), Hitox buff titanium dioxide from TOR Minerals International (Corpus Christi, Tex.), R-902 titanium dioxide from Dupont (Willington, Del.). Examples of preferred UV absorbing components are CR-828 from Kerr-McGee and Y25LOM yellow iron oxide from Revelli Chemical (Greenwich, Conn.). The UV absorbing component may be present in the aqueous composition in a range of from about 2.0 percent by weight to about 40.0 percent by weight, preferably from about 4.0 percent by weight to about 20.0 percent by weight based on the total weight of the barrier composition. A UV absorbing component content greater than about 40.0 percent by weight may be less desirable in that it would make the product too viscous to spray. Alternatively, a content less than about 2.0 percent by weight may be less desirable in that the product would have insufficient UV protection and poor coloration.

Other UV absorbing components useful include Tinuvin 192, 1130, and 5151 from Ciba Specialty Chemical (Newport, Del.), Dabco UVCW-30 from Elementis Specialties (Highstown, N.J.), and Zinc oxide grades Kadox 911, Kadox 901, and XX503R from Horsehead Corp. (Monaca, Pa.). Examples of preferred UV absorbing components include Tinuvin 5151 and Kadox 911. These UV absorbing components may be present in the aqueous composition in a range of from about 0.10 percent by weight to about 5.0 percent by weight, preferably from about 0.50 percent by weight to about 1.0 percent by weight based on the total weight of the composition. A content greater than about 5.0 percent by weight may be less desirable in that cost becomes too high and there would be diminishing value in further weather protection. Alternatively, a content less than about 0.10 percent by weight may be less desirable in that there would be insufficient weather protection.

The aqueous composition contains at least one fungicide. Useful fungicides include Nuocide 404D from ISP Corp. (Charlotte, N.C.), Zinc and Sodium Omadine from Arch Chemical (Cheshire, Conn.), Amical Flowable from Dow Chemical (Midland, Mich.), Rozone 2000, Rozone 200, Rocima 63, Rocima 65 and Skane 8 from Rohm & Haas (Springhouse, Pa.), Mergal S-90, Polyphase 678, and Mergal S-89 from Troy Chemical (Florham, N.J.), and Fungitrol 720 from ISP Corp. (Charlotte, N.C.). The fungicide (active content) is present in the aqueous composition in a range of from about 0.05 percent by weight to about 4.0 percent by weight, preferably from about 0.10 percent by weight to about 2.0 percent by weight based on the total weight of the composition. Fungicide content greater than about 4.0 percent by weight may be less desirable in that of excessive cost without further resistance to fungal growth. Alternatively, fungicide content less than about 0.05 percent by weight may be less desirable in that it would be insufficient to control all the fungus and mold, and have a shortened useful life. The fungicides are used at a level within the United States Environmental Protection Agency (EPA) allowed ranges, and at a level as required for long term protection depending upon the degree of exposure. In situations where multiple types or species of organisms are likely to be found, two or more fungicides may be required in other to inhibit the growth of all of them. Preferably, the fungicides have low water solubility (less than about 50 parts per million), excellent resistance against hydrolysis, be resistant to degradation by UV where exposed to sunlight (unless sufficient UV absorbers are used).

The aqueous composition contains at least one dispersant. The dispersant is a means to disperse the pigments and prevent agglomeration on product aging. Useful dispersants include BYK-155, 156, 190, 191, or 194 from BYK Chemie (Wallingford, Conn.), AMP-95 from Dow Chemical (Midland, Mich.), and Tamol 850, Tamol 730 from Rohm & Haas (Springhouse, Pa.). Examples of preferred dispersants include AMP-95 from Dow Chemical (Midland, Mich.), and BYK-156 from BYK Chemie (Wallingford, Conn.). The dispersant is present in the aqueous composition in a range of from about 0.10 percent by weight to about 3.0 percent by weight, preferably from about 0.20 percent by weight to about 1.0 percent by weight based on the total weight of the composition. Dispersant content greater than about 3.0 percent by weight may be less desirable in that it could adversely affect viscosity stability and water resistance of the dried film. Alternatively, a dispersant content less than about 0.10 percent by weight may be less desirable in that the product would show poor viscosity stability on aging, pigment agglomeration and spray gun clogging.

The aqueous composition contains at least one surfactant. The surfactant is a means to lower surface tension for improved surface wetting, pigment dispersion and polymer stability. Useful surfactants include Triton X-100 and Triton X-405 from Dow Chemical (Midland, Mich.), Surfynol Tg; Surfynol 104H; and Surfynol PSA 336 from Air Products (Allentown, Pa.). Examples of preferred surfactants include Surfynol 104H and Triton X-405 from Dow Chemical (Midland, Mich.). The surfactant is present in the composition in a range of from about 0.10 percent by weight to about 2.0 percent by weight, preferably from about 0.20 percent by weight to about 1.0 percent by weight based on the total weight of the composition. Surfactant content greater than about 2.0 percent by weight may be less desirable in that it would hurt the dried film's water resistance and durability. Alternatively, a surfactant content less than about 0.10 percent by weight may be less desirable in that it would not sufficiently lower the surface tension for adequate surface wetting and aiding in pigment dispersion.

The aqueous composition may contain at least one thickener. Useful thickeners include Kelzan S from CP Kelco (Chicago, Ill.), Cellosize QP-100MH and Cellosize QP-4400 from Dow Chemical (Midland, Mich.), Alcogum L-89 and Alcogum SL-117 from Alco Chemical (Chattanooga, Tenn.), and Rheolate 244, Rheolate 300 from Elementis Specialties (Highstown, N.J.). The thickener may be present in the aqueous composition in a range of from about 0.10 percent by weight to about 3.0 percent by weight, preferably from about 0.20 percent by weight to about 1.0 percent by weight based on the total weight of the composition. The aqueous composition has a viscosity in a range of from about 500 centipoise to about 10,000 centipoise, preferably from about 800 centipoise to about 6,000 centipoise. A viscosity greater than about 10,000 centipoise may be less desirable in that it would likely not spray well and have less desirable wetting out of substrates. Alternatively, a viscosity less than about 500 centipoise may be less desirable in that it would run down on vertical surfaces providing reduced coat weight and would tend to show separation in the container on standing before it could be applied.

The aqueous composition may contain at least one defoamer. Useful defoamers include DFC-17 and DFC-47 from HiMar Specialities (Milwaukee, Wis.), Antifoam B, Additive 62 and 65 from Dow Corning Corp. (Midland, Mich.), Rhodaline 646 and Rhodaline 675 from Rhodia, Inc. (Cranbury, N.J.). Examples of preferred defoamers include DFC-17 from HiMar Specialities, and Antifoam B from Dow Corning Corp. The defoamer may be present in the composition in a range of from about 0.10 percent by weight to about 1.0 percent by weight, preferably from about 0.20 percent by weight to about 0.50 percent by weight based on the total weight of the weather barrier composition. Defoamer content greater than about 1.0 percent by weight may be less desirable in that cause film surface defects and loss of adhesion to the substrate. Alternatively, defoamer content less than about 0.10 percent by weight may be less desirable in that it could be insufficient to completely prevent excessive air entrapment.

The aqueous composition may contain at least one filler. The filler is a means to improve the film durability, abrasion resistance, and lower cost. Useful fillers include Minex 4 and Minex 7 from Unimin Corp (New Canaan, Conn.), clay and Vansil W-30 from R.T. Vanderbelt Corp. (Norwalk, Conn.), calcium carbonate from J. M. Huber Corp (Atlanta, Ga.), and Satintone W from BASF Catalyst-Engelhard Corp. (Iselin, N.J.). Examples of preferred fillers include calcium carbonate, Minex 4, Minex 7, and Vansil W-30. The filler may be present in the aqueous composition in a range of from about 2.0 percent by weight to about 30.0 percent by weight, preferably from about 5.0 percent by weight to about 20.0 percent by weight based on the total weight of the composition. Filler content greater than about 30.0 percent by weight may be less desirable in that there would be a loss in film strength, flexibility and durability. Alternatively, filler content less than about 2.0 percent by weight may be less desirable in that it would be insufficient for improving the toughness, abrasion resistance.

The aqueous composition may contain at least one fire retardant. Useful fire retardants include Zinc Oxide from Horsehead Corp. (Menaca, Pa.), Magnesium Hydroxide from Martin Marietta Magnesia Specialties (Baltimore, Md.), Zinc Borate from Luzenac America Inc. (Centennial, Colo.), and Hydrated Alumina from J.M. Huber Corp. (Atlanta, Ga.) The fire retardant may be present in the aqueous composition in a range of from about 2.0 percent by weight to about 30.0 percent by weight, preferably from about 5.0 percent by weight to about 20.0 percent by weight based on the total weight of the composition. Flame retardant content greater than about 30.0 percent by weight may be less desirable in that there would be a loss in film strength, flexibility and durability. Alternatively, flame retardant content less than about 2.0 percent by weight may be less desirable in that it would be insufficient for improving fire resistance.

The aqueous composition used in the method of the invention may contain at least one adhesion promoter. Useful adhesion promoters include Silquest A 1637; A-1120; A-189; and A-187 from GE Silicones (Wilton, Conn.), Z-6020 and Z-6040 from Dow Corning (Midland, Mich.). Examples of preferred adhesion promoters include Silquest A 1637 and Silquest A-1120 from GE Silicones (Wilton, Conn.). The adhesion promoter may be present in the aqueous composition in a range of from about 0.05 percent by weight to about 2.0 percent by weight, preferably from about 0.20 percent by weight to about 1.0 percent by weight based on the total weight of the composition. Adhesion promoter content greater than about 2.0 percent by weight may be less desirable in that it would be more than needed for a mono-molecular layer on the substrate, and the cost would be very high. Alternatively, adhesion promoter content less than about 0.05 percent by weight may be less desirable in that it would be insufficient for improving substrate adhesion.

The aqueous composition may contain at least one freeze/thaw stabilizer. Useful freeze/thaw stabilizers include ethylene glycol, propylene glycol and ethanol solvent from Ashland Chemical (Covington, Ky.). Examples of preferred freeze/thaw stabilizers include propylene glycol and ethylene glycol. The freeze/thaw stabilizer may be present in the aqueous composition in a range of from about 0.50 percent by weight to about 4.0 percent by weight, preferably from about 1.0 percent by weight to about 3.0 percent by weight based on the total weight of the weather barrier composition. Freeze/thaw stabilizer content greater than about 4.0 percent by weight may be less desirable in that it would make the composition too water sensitive and the drying time too long and increase the volatile organic content of the aqueous composition. Alternatively, a freeze/thaw stabilizer content less than about 0.50 percent by weight may be less desirable in that it would insufficient to insure good freeze-thaw stability.

The aqueous composition may contain at least one co-solvent. When present in the composition, the co-solvent is a means to improve film coalescence at low temperatures of below 50 F (10 C), and improve sprayability and substrate wetting. Useful cosolvents include Dowanol DPnB, PnP and PPH from Dow Chemical (Midland, Mich.), Texanol from Eastman Chemical (Kingsport, Tenn.), Glycol Ether PB, EB, and DPM from Ashland Chemical (Covington, Ky.). Examples of preferred cosolvents include Dowanol DPnB from Dow Chemical and Texanol from Eastman Chemical. The co-solvent may be present in the aqueous composition in a range of from about 0.20 percent by weight to about 4.0 percent by weight, preferably from about 0.40 percent by weight to about 2.0 percent by weight based on the total weight of the weather barrier composition. Co-solvent content greater than about 4.0 percent by weight may be less desirable in that the cost benefit drops off, the VOC content would restrict product use, and there could be product compatibility problems. Alternatively, co-solvent content less than about 0.20 percent by weight may be less desirable in that it would be insufficient for insuring good film formation at low temperatures, and be insufficient for improving substrate wetting.

The aqueous composition may contain at least one hydrophobic agent for improving the water resistance of the dried film. Useful hydrophobic agents include Dynasylan OCTEO from Degussa (Akron, Ohio), Additive 51, 52, 85 and IE-6694 from Dow Corning (Midland, Mich.), Perenol HF 200 from Cognis (Cincinnati, Ohio), Michem Emulsion 62330, 693, 66035, and WC 50 from Michelman, Inc. (Cincinnati, Ohio), Zonyl 8867L from DuPont (Willington, Del.), and Tego Phobe 1401 from Tego Chemie Div., Degussa Corp. (Parsippany, N.J.). The hydrophobic agent may be present in the aqueous composition in a range of from about 0.20 percent by weight to about 8.0% percent by weight (active content), preferably from about 1.0 percent by weight to about 4.0 percent by weight based on the total weight of the weather barrier composition. Hydrophobic agent content greater than about 8.0 percent by weight may be less desirable in that it may cause film surface defects and loss of adhesion to the substrate or of paints used over the surface. Alternatively, hydrophobic agent content less than about 0.20 percent by weight may be less desirable in that it could be insufficient to improve the water resistance of the dried film.

If desired, other additives may be used in the aqueous composition and include plasticizers, resin and resin ester dispersions, colorants such as red, brown or yellow iron oxide pigments from Revelli Chemical (Greenwich, Conn.), and organic-based pigments from the Clariant Pigment and Additive division (Coventry, R.I.). Other components that can be included in the composition formulation are antimicrobial agents for protecting the surface against mold growth; agents to inhibit termites and other pests form penetrating the composition, wetting agents, coalescent solvents, plasticizers, dyes and other components known to those skilled in composition and paint formulating. Hydrophobic agents for improving the water resistance include oroganosilanes, organosilonanes, silicone emulsions, fluorochemicals and fluoropolymers, as well as wax emulsions.

The aqueous composition has a pH in a range of from about 7 to about 10, preferably in a range of from about 7.5 to about 9.0. A pH greater than about 10 may be less desirable in that it would increase the water sensitivity of the dried film. Alternatively, a pH less than about 7.5 may be less desirable in that there would be a potential for viscosity loss on aging and corrosion of metal surfaces.

The aqueous composition has a solid content in a range of from about 25 to about 65 percent, preferably in a range of from about 35 to about 55 percent. Solids content greater than about 65 percent may be less desirable in that there would be a difficulty in application and a loss of storage stability. Alternatively, solids content less than about 25 percent may be less desirable in that there would be a long drying time, possible phase separation or settling problems on aging, and difficulty in obtaining freeze-thaw stability.

The aqueous composition can be formed using conventional blending and mixing techniques. Preferably, water is added first, then the thickeners. surfactants, dispersants, and defoamer, followed by the fillers and silica containing components, then the polymer emulsion and other additives using mechanical agitation.

The invention also discloses a method for providing an effective weather, air and water barrier while maintaining moisture vapor permeability through the application of a water-based composition to the surface of a substrate often used in the construction of buildings. As previously discussed, the water-based composition is composed of a flexible film-forming polymer, supplied in an emulsion or dispersion, inorganic mineral fillers, fire retardants and pigments, and at least one silica containing mineral component that allows for a diffusion of moisture vapor through the dried film. The silica containing component is either that of colloidal or precipitated amorphous silica, or a celite, or a perlite, attapulgite clay, or a diatomaceous earth. These silica containing components provide moisture vapor diffusion either by the porosity of the particles, a swelling of the particle or by the chain-like structure of the colloidal or precipitated silica. It has been found that high moisture vapor permeability can be obtained through the dried film when the silica component is used at about 5 percent to about 30 percent of the total dried film weight. The silica content is kept at less than about 45 percent of the total mineral content, and with a pigment volume concentrate of about 25 percent to about 45 percent to maintain good film toughness and flexibility. To have a good permeability to moisture vapor, the silica component preferably is in a range of from about 25 percent to about 100 percent of the weight of the polymer solids. Surprisingly, a water-based composition formulation can provide a dried barrier coating having moisture vapor permeability in a range of from about 2 metric perms to about 16 metric perms (3-25 U.S. Perms), tested at 37.8 C (100 F) at 75 percent relative humidity by the dry cup method of ASTM E-96 with a dried film thickness in a range of from about 38 microns to about 150 microns (1.5-6.0 mils).

The inventive method for the preparation of coated surfaces, having effective weather, water and air barrier characteristics while maintaining excellent permeability to moisture vapor, comprising the steps of:

1) providing at least one aqueous composition comprising;
   a) at least one water-based film forming polymer:
   b) at least one non-crystalline silica or silicate mineral:
   c) at least one other mineral filler:
   d) at least one fungicide:
   e) at least one ultraviolet light absorbing component:
   f) at least one dispersant; and
   g) at least one surfactant; then.
2) providing at least one substrate;
3) applying said composition onto said substrate to form a wet-coated substrate;
4) drying the wet-coated substrate to form a dry coated substrate.

In the method of the present invention, the water-based composition can be either spray, brushed, or paint roller applied on the construction site to the construction surfaces, or supplied as an article to the construction site by pre-application to construction panels, such as oriented strand board, plywood, gypsum based sheeting, and other sheeting materials. Pre-application of the water-based composition onto the substrate (e.g., construction surface) may significantly reduce the cost of construction by increasing efficiency through effective control of coverage rate and uniformity. In a manufacturing plant, application methods include using a roll coater or by the use of a spray bar, followed by a drying chamber to dry the composition before stacking.

If desired, the wet-coated substrate formed in the method of the present invention may be dried using conventional techniques including ambient environmental drying, forced air drying, and forced air/heat drying. For example, the aqueous composition may be coated onto the substrate when it is being manufactured by the use of a roll coater or a spray bar, and followed by an infra-red heat drying chamber. The aqueous composition is applied onto the surface in a range of from about 100 square feet per gallon to about 300 square feet per gallon, preferably from about 150 square feet per gallon to about 250 square feet per gallon. A wet coat-weight less than 100 square feet per gallon may be less desirable in that it would be very slow to dry. Alternatively, a wet coat-weight greater than 300 square feet per gallon may be less desirable in that there would be insufficient dry-film thickness for providing adequate water and abrasion resistance.

The water-based composition may be applied onto a substrate wherein the substrate is completely or partially coated. For example, a multi-surfaced substrate having two distinct surfaces (e.g., front and back) may be coated on one or both sides.

If desired, the dried barrier-coated substrate can be easily sawed without chipping of the composition, and maintains a water seal around nails that penetrate the coated panel on mounting to the building. Furthermore, the dried barrier-coated substrate will resist cracking if pounded with a hammer. It can be over coated with other water-based paints with good adhesion and compatibility.

Furthermore, the invention provides a method of obtaining a barrier composition without the inherent problems with the use of a sheet material. With the barrier composition applied onto the wall sheeting panel, the air space which is behind an attached barrier sheeting material is substantially eliminated. Therefore, no water can flow behind the composition as it would behind an attached barrier sheeting if there is any water penetration of the finished siding, which may result in damage to the construction surfaces. The joints between the sheeting panels can be sealed off using any current method such as sealing tapes or filling the joints with a liquid applied sealant where required to provide an air barrier. The exterior face of the construction surface can be made with groves either pressed or cut into it to provide vertical channels for water to run down if it gets behind the siding applied over the coated sheeting surface. The channeled surface can still be easily coated by spraying or by using a roll coater. This would eliminate any need for a separate drainage system.

The following test methods were used to quantify the properties of the inventive water-based compositions.

Solids Content
 ASTM D 2832, Method A

Viscosity
 ASTM D-2196: Using a Brookfield Viscometer, Model RVT, using spindle #3 or #4 at 20 RPM.

Aqueous pH
 ASTM E 70, Standard Test Method for pH of Aqueous Solutions with the Glass Electrode.

Weight Per Gallon
 ASTM D 1475

Moisture Vapor Permeability
 ASTM E-96: The dry cup method, 100 F (37.8 C)/75% relative humidity differential. Aqueous compositions were applied onto 5 mil paper at 150-300 ft2/gallon, coated side of the paper facing the 75% relative humidity, and the back side of the paper facing the 0% relative humidity.

Water Resistance
 AATCC Method 127: With the exception the test specimens were held at a hydrostatic head of 55 cm (21.6 inches) for a period of five hours at 23 centigrade. The composition was tested on various substrates at 150-250 ft2/gallon coverage rate, and water passage over 0.02 grams/square inch through the substrate noted as a failure. Weight of water absorption by the substrate and the weight of water passage were recorded Air Permeability
 Dried composition applied to various substrates tested for air permeability at 1.57 psf (75 Pa, or 0.3 inch water head) and at 5.23 psf (250 Pa or 1.0 inch water head), and air passage reported as cfm/sf (L/s/M2). Method used was to bond a coated substrate to a 1½ inch diameter PVC pipe with the composition on the outside and with the air pressure applied to the back side of the substrate at 23 centigrade.

The following examples are used to illustrate the present invention.

Example 1 (Comparative)

Example 1 is a water-based composition that is not part of the present invention.

The Sto Corp., Atlanta, Ga., currently markets their Sto Gold Coat as a liquid applied house rape with a reported moisture vapor transmission rate of 5.6 U.S. Perms by the wet cup method, and good air and water barrier properties. The product has a measured weight per gallon of 12.0 pounds, solids of 73 percent, and a viscosity of 18,000 cps. The MSDS shows it contains from 30-60 percent weight crystalline silica (quartz sand) which is considered a carcinogen. The silica is used to provide the desired moisture vapor transmission rate. Due to the health hazards of using crystalline silica, there is value in obtaining a product which does not use crystalline silica, but obtains the desired moisture vapor transmission rate using other selected non-hazardous minerals. Actual moisture permeability tests by the dry cup method of ASTM E-96 gave a permeability of 0.33 metric perms (0.50 U.S. perms) at a coverage rate of 200 ft2/gallon, Example 2

Example 2 describes a water-based composition that is part of the present invention:

| | | |
|---|---|---|
| Water | 24.05 | |
| Kelzan S, thickener | 0.04 | |
| Cellosize QP-100MH, thickener | 0.08 | |
| DFC-17, defoamer | 0.16 | |
| Triton X-405, surfactant | 0.40 | |
| BYK-156, dispersant | 0.48 | |
| CR-828, white pigment | 4.76 | |
| Calcium Carbonate, filler | 11.90 | |
| Polyphase 678 (20%), fungicide | 0.79 | |
| UCAR 820 (45%), binder | 30.13 | |
| Dialite 426, perlite | 11.10 | |
| WC-50, (30%), hydrophobe | 13.56 | |
| Plasticizer Reofos 65 | 1.60 | |
| Texanol, coalescent | .95 | |
| Total-- | 100.00 | |

The aqueous composition has a volatile organic content less than 0.10 percent, a pigment volume concentration of 31.46 percent, a viscosity of 2,000-3000 centipoise, a pH of 8-9, a solids content of 49.0 percent, a weight per gallon of 9.9 pounds. The dried aqueous composition had no water penetration when applied onto 5 mil thick paper at 200 square-feet per gallon. The air permeability was 0.00019 cfm/sf at 5.2 psf. Moisture vapor permeability, applied onto 5 mil paper at 250 square-feet per gallon, was 6.75 U.S. Perms (4.45 Metric Perms).

Compared to example 1, example 2 has increased moisture vapor permeability without the use of crystalline silica showing the utility of the invention.

Example 3

Example 3 describes a water-based composition that is part of the present invention:

| | | |
|---|---|---|
| Water | 44.00 | |
| Kelzan S, thickener | 0.04 | |
| Cellosize QP-100MH, thickener | 0.08 | |
| DFC-17, defoamer | 0.24 | |
| Triton X-405, surfactant | 0.39 | |
| BYK-156, dispersant | 0.47 | |
| CR-828, white pigment | 3.94 | |
| Zinc Oxide, UV absorber | 1.97 | |
| Magnesium Hydroxide | 3.94 | |
| Zinc Borate, fire retardant | 7.89 | |
| Polyphase 678 (20%), fungicide | 0.79 | |
| Dynasylan OCTEO, hydrophobe | 0.79 | |
| Airflex 728 (52%), binder | 26.66 | |
| Zeofree 80, silica | 6.31 | |
| Plasticizer | 1.58 | |
| Texanol, coalescent | 0.79 | |
| Total-- | 100.00 | |

The aqueous composition has a volatile organic content of less than 0.10 percent, a pigment volume concentration of 37.4 percent, a viscosity of 2,000 centipoise, a pH of 8, a solids content of 43.0 percent, a weight per gallon of 10.5 pounds. The dried aqueous composition had a water resistance of no water penetration when tested applied onto 5 mil thick paper at 250 square-feet per gallon. The air permeability was 0.00024 cfm/sf at 5.2 psf. Moisture vapor permeability, applied onto 5 mil paper at 250 square-feet per gallon, was 5.3 metric perms (8.0 U.S. Perms).

Example 4

Example 4 describes a water-based composition that is part of the present invention:

| | | |
|---|---|---|
| Water | 30.32 | |
| Attagel 19, silica containing | 7.29 | |
| Cellosize QP-100MH, thickener | 0.10 | |
| DFC-17, defoamer | 0.31 | |
| Triton X-405, surfactant | 0.52 | |
| BYK-156, dispersant | 0.63 | |
| CR-828, white pigment | 5.21 | |
| Zinc Oxide, UV absorber | 2.60 | |
| Magnesium Hydroxide | 5.21 | |
| Zinc Borate, fire retardant | 10.42 | |
| Polyphase 678 (20%), fungicide | 1.04 | |
| Dynasylan OCTEO, hydrophobe | 1.04 | |
| UCAR 123 (60%), binder | 32.29 | |
| Plasticizer Reofos 65 | 1.98 | |
| Texanol, coalescent | 1.04 | |
| Total-- | 100.00 | |

The aqueous composition has a volatile organic content of less than 0.10 percent, a pigment volume concentration of 29.2 percent, a viscosity of 2,200 centipoise, a pH of 8, a solids content of 44.4 percent, a weight per gallon of 10.2 pounds. The dried aqueous composition had no water penetration when tested applied onto 5 mil thick paper at 180 square-feet per gallon. The air permeability was 0.00024 cfm/sf at 5.2 psf and the moisture vapor permeability, applied onto 5 mil paper at 220 ft2/gallon, was 4.68 metric perms (7.1 U.S. Perms).

Example 5

Example 5 describes a water-based composition that is part of the present invention.

| | | |
|---|---|---|
| Water | 38.31 | |
| Dialite 426, perlite | 8.26 | |
| Cellosize QP-100MH, thickener | 0.08 | |
| DFC-17, defoamer | 0.23 | |
| Triton X-405, surfactant | 0.38 | |
| BYK-156, dispersant | 0.45 | |
| CR-828, white pigment | 3.76 | |
| Zinc Oxide, UV absorber | 1.88 | |
| Magnesium Hydroxide | 3.76 | |
| Zinc Borate, fire retardant | 7.51 | |
| Polyphase 678 (20%), fungicide | 0.75 | |
| Dynasylan OCTEO, hydrophobe | 0.75 | |
| Phobe 1401, hydrophobe | 2.25 | |
| UCAR 820 (45%), binder | 29.38 | |
| Plasticizer Reofos 65 | 1.50 | |
| Texanol, coalescent | 0.75 | |
| Total-- | 100.00 | |

The aqueous composition has a volatile organic content of less than 0.10 percent, a pigment volume concentration of 35.8 percent, a viscosity of 2,300 centipoise, a pH of 8, a solids content of 44.4 percent, a weight per gallon of 10.2 pounds. The dried aqueous composition had no water penetration when tested applied onto 5 mil thick paper at 180 square-feet per gallon. The air permeability was 0.003 cfm/sf at 5.2 psf and the moisture vapor permeability, applied onto 5 mil paper at 250 square feet per gallon, was 5.40 metric perms (8.20 U.S. Perms).

Example 6

Example 6 describes a water-based composition that is part of the present invention:

| Water | 30.31 |
| Dialite 426, perlite | 10.28 |
| Kelzan S, thickener | 0.04 |
| Cellosize QP-100MH, thickener | 0.08 |
| DFC-17, defoamer | 0.16 |
| Triton X-405, surfactant | 0.40 |
| BYK-156, dispersant | 0.47 |
| CR-828, white pigment | 4.74 |
| Calcium Carbonate, filler | 11.86 |
| Michem WC 50 (30%), hydrophobe | 8.85 |
| Polyphase 678 (20%), fungicide | 0.79 |
| UCAR 820 (45%), binder | 29.49 |
| Reofos 65, plasticizer | 1.58 |
| Texanol, coalescent | 0.95 |
| Total-- | 100.00 |

The aqueous composition has a volatile organic content of less than 0.10 percent, a pigment volume concentration of 34.5 percent, a viscosity of 1,200 centipoise, a pH of 9, a solids content of 46.3 percent, a weight per gallon of 10.0 pounds. The dried aqueous composition had no water penetration when tested applied onto 5 mil thick paper at 200 square-feet per gallon. The air permeability was 0.0027 cfm/sf at 5.2 psf and the moisture vapor permeability, applied onto 5 mil paper at 250 ft2/gallon, was 5.27 metric perms (8.0 U.S. Perms).

Example 7

Example 7 describes a water-based composition that is part of the present invention:

| Water | 24.61 |
| Dialite 426, perlite | 11.68 |
| Kelzan S, thickener | 0.04 |
| Cellosize QP-100MH, thickener | 0.08 |
| DFC-17, defoamer | 0.16 |
| Triton X-405, surfactant | 0.41 |
| BYK-156, dispersant | 0.49 |
| CR-828, white pigment | 4.87 |
| Calcium Carbonate, filler | 12.17 |
| Michem WC 50 (30%), hydrophobe | 9.25 |
| Polyphase 678 (20%), fungicide | 0.81 |
| Raykote 1020 (44%), binder | 31.63 |
| Reofos 65, plasticizer | 1.62 |
| Dowanol DPnB, cosolvent | 1.21 |
| Texanol, coalescent | 0.97 |
| Total-- | 100.00 |

The aqueous composition has a volatile organic content of 1.23 percent, a pigment volume concentration of 37.2 percent, a viscosity of 1,250 centipoise, a pH of 8.3, a solids content of 49.0 percent, a weight per gallon of 10.3-10.5 pounds. The dried aqueous composition had no water penetration when tested applied onto 5 mil thick paper at 200 square-feet per gallon. The air permeability was 0.0035 cfm/sf at 5.2 psf and the moisture vapor permeability, applied onto 5 mil paper at 250 ft2/gallon, was 5.1 metric perms (7.7 U.S. Perms).

Example 8

Example 8 describes a water-based composition that is part of the present invention:

| Water | 33.95 |
| Dialite 426, perlite | 5.00 |
| Kelzan S, thickener | 0.05 |
| Zeofree 80, thickener | 4.00 |
| Surfynol 104H, surfactant | 0.10 |
| DFC-17, defoamer | 0.30 |
| Triton X-405, surfactant | 0.50 |
| BYK-156, dispersant | 0.60 |
| CR-828, white pigment | 5.00 |
| Zinc Oxide, UV absorber | 2.00 |
| Magnesium Hydroxide, fire retardant | 4.00 |
| Zinc Borate, fire retardant | 10.0 |
| Polyphase 678 (20%), fungicide | 1.00 |
| Dynasylan OCTEO, hydrophobe | 1.00 |
| UCAR 123 (60%), binder | 29.50 |
| Reofos 65, plasticizer | 2.00 |
| Texanol, coalescent | 1.00 |
| Total-- | 100.00 |

The aqueous composition has a volatile organic content of less than 0.10 percent, a pigment volume concentration of 31.1 percent, a viscosity of 1,200 centipoise, a pH of 8, a solids content of 53.0 percent, a weight per gallon of 10.2 pounds. The dried aqueous composition had no water penetration when applied onto 5 mil thick paper at 200 square-feet per gallon. The air permeability was 0.0002 cfm/sf at 6.5 psf and the moisture vapor permeability, applied onto 5 mil paper at 250 square-feet per gallon, was 4.8 metric perms (7.3 U.S. Perms).

Example 9

Example 9 describes a water-based composition that is part of the present invention:

| Water | 29.86 |
| Dialite 426, perlite | 11.06 |
| Kelzan S, thickener | 0.04 |
| Cellosize QP-100MH, thickener | 0.08 |
| DFC-17, defoamer | 0.17 |
| Triton X-405, surfactant | 0.42 |
| BYK-156, dispersant | 0.51 |
| CR-828, white pigment | 5.07 |
| Calcium Carbonate, filler | 12.67 |
| Michem 66035 (35%), hydrophobe | 8.45 |
| Polyphase 678 (20%), fungicide | 0.84 |
| UCAR 145 (48%), binder | 28.13 |
| Reofos 65, plasticizer | 1.69 |
| Texanol, coalescent | 1.01 |
| Total-- | 100.00 |

The aqueous composition has a volatile organic content of less than 0.10 percent, a pigment volume concentration of 35.3 percent, a viscosity of 1,200 centipoise, a pH of 8, a solids content of 49.0 percent, a weight per gallon of 10.1 pounds. The dried aqueous composition had no water penetration when applied onto 5 mil thick paper at 200 square-feet per gallon. The air permeability was 0.0014 cfm/sf at 5.2 psf and the moisture vapor permeability, applied onto 5 mil paper at 250 square-feet per gallon, was 2.8 metric perms (4.3 U.S. Perms).

What is claimed is:

1. A method for the manufacture of a coated substrate, having a moisture vapor permeable air and water barrier, of greater than about 0.949 metric Perms, on at least one surface of the substrate, comprising the steps of:
   1) providing at least one aqueous composition comprising;
      a) at least one water-based film forming polymer in a range from about 10-50%:
      b) at least one non-crystalline silica or silicate mineral in a range from about 8-38%:
      c) at least one mineral filler in a range from about 2-30%:
      d) at least one fungicide in a range from about 0.05-4%:
      e) at least one ultraviolet light absorbing component in a range from about 0.1-40%:
      f) at least one dispersant in a range from about 0.1-3%; and
      g) at least one surfactant in a range from about 0.1-2%; then.
   2) providing at least one substrate;
   3) applying said composition onto said substrate to form a wet-coated substrate;
   4) drying the wet-coated substrate to form a dry coated substrate having a dried barrier-composition thereon.

2. The method as described in claim 1, wherein said composition has a volatile organic content less than about 3.0 percent.

3. The method as described in claim 1, wherein said composition has a pigment volume concentration in a range of from about 25% to about 45%.

4. The method as described in claim 1, wherein the dried barrier-composition is substantially free of crystalline silica.

5. The method as described in claim 1, wherein said silica is amorphous.

6. The method as described in claim 1, wherein the composition is applied onto the substrate in a range of from about 100 square feet per gallon to about 250 square feet per gallon.

7. The method as described in claim 1, wherein the dried barrier-composition has a film thickness in a range of from about 50 microns to about 150 microns.

8. The method as described in claim 1, wherein the dried barrier-composition has an moisture vapor permeability in a range of from about 2 metric perms to about 16 metric perms.

9. The method as described in claim 1, wherein the dried barrier-composition has an air permeability from about 0.0002 to 0.004 ft3/minute-ft2.

10. The method as described in claim 1, wherein said substrate is cellulosic.

11. The method as described in claim 1, wherein the wet-coated substrate is dried under ambient environmental conditions.

12. The method as described in claim 1, wherein the wet-coated substrate is dried using infra-red energy.

* * * * *